J. O. DAVISON.
HANDLE.
APPLICATION FILED JUNE 12, 1908.
910,648.
Patented Jan. 26, 1909.
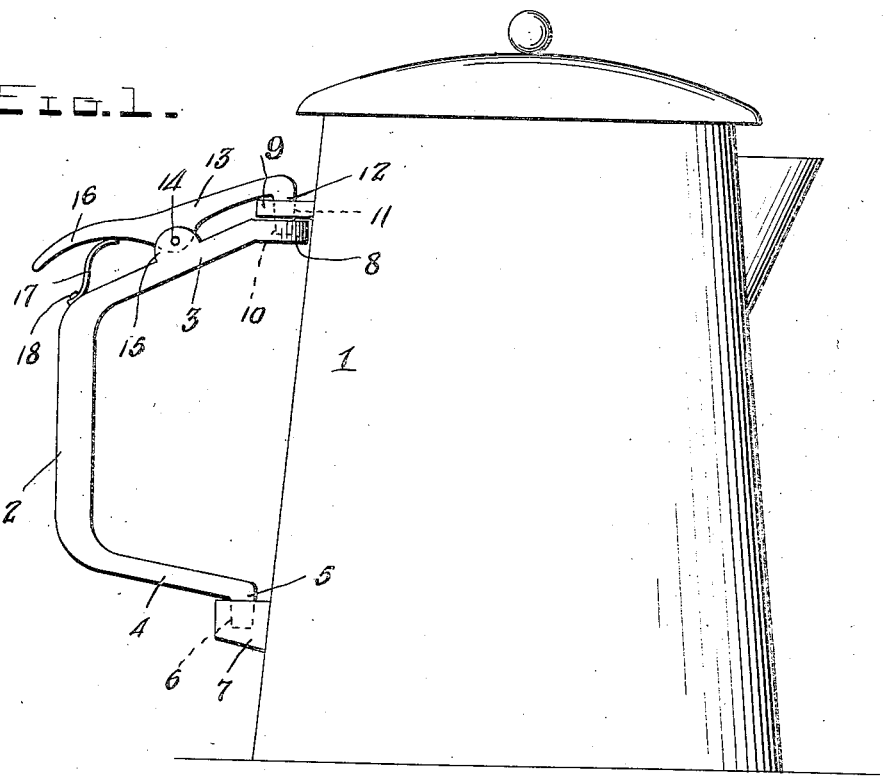
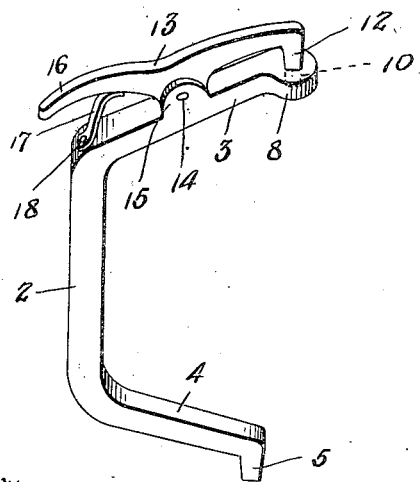
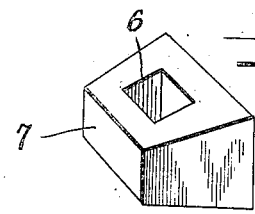
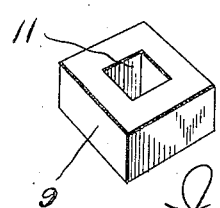
Witnesses
Chas. L. Griesbauer.
M. L. Skinner.
Inventor
J. O. Davison
By Watson E. Coleman
Attorney

UNITED STATES PATENT OFFICE.

JESSE O. DAVISON, OF MURRAY, IOWA.

HANDLE.

No. 910,648.　　Specification of Letters Patent.　　Patented Jan. 26, 1909.

Application filed June 12, 1908. Serial No. 438,168.

*To all whom it may concern:*

Be it known that I, JESSE O. DAVISON, a citizen of the United States, residing at Murray, in the county of Clarke and State of Iowa, have invented certain new and useful Improvements in Handles, of which the following is a specification, reference being had to the accompanying drawings.

This invention relates to improvements in handles for coffee pots, cooking utensils and other receptacles and more particularly to one which may be removed from the pot or receptacle while the latter is upon the stove so that it will not become heated.

The object of the invention is to provide a simple and practical handle of this character which may be quickly and easily removed from and applied to a coffee pot or the like and which when applied will serve as a safe and convenient hand grip for such pot or receptacle.

With the above and other objects in view, the invention consists of the novel features of construction and the combination and arrangement of parts hereinafter fully described and claimed, and illustrated in the accompanying drawings, in which—

Figure 1 is a side elevation of the improved handle showing it applied to a coffee pot, parts being in section; Fig. 2 is a perspective view of the handle; and Figs. 3 and 4 are detail perspective views of the lugs upon the pot.

In the drawings 1 denotes a coffee pot or any other cooking utensil or receptacle upon which the improved handle 2 is arranged. The handle comprises a substantially U-shaped body having a vertical portion which forms a hand grip and upper and lower arms 3, 4, the latter of which is formed at its end with a downwardly bent foot or projection 5, preferably of rectangular shape, to enter a similar shaped opening or socket 6 formed in a lug or projection 7 upon the lower portion of the pot 1. The upper arm 3 has a flat or rectangular inner end 8 adapted to fit against the pot 1 and beneath a lug or projection 9 arranged upon the upper portion of the pot vertically above the lug 7. The end 8 of the handle is formed with an opening or socket 10 adapted to register with an opening 11 formed in the lug 9 and to receive the downturned end or hook 12 of a latch lever 13. The latter is pivoted intermediate its ends by a pin 14 to a bearing ear or ears 15 formed upon the top of the arm 3 and the outer end of said latch lever is shaped to provide a finger piece 16 disposed over the upper end of the vertical or hand grip portion of the handle. A leaf spring 17 secured at 18 to the handle has its free end bearing upwardly against the finger piece of the lever so as to throw its hook end or dog 12 downwardly and maintain the same in the openings 11, 10 to fasten the handle to the pot.

In use, the handle is employed to lift and carry the pot or receptacle 1 in the usual manner and after it has been placed upon a stove the handle may be readily removed by simply depressing the finger piece 16, then swinging the arm 3 outwardly, and then lifting the end 5 of the arm 4 upwardly out of the lug 7. By reversing this operation the handle may be as quickly and easily applied to the pot. When removed from the same, it may be laid aside where it will not become heated as will the pot when the latter is upon the stove.

From the foregoing it will be seen that the invention is exceedingly simple in construction so that it may be produced at a small cost and will be strong, durable, convenient and reliable.

Having thus described the invention what is claimed is:

The combination with a receptacle having upper and lower lugs projecting therefrom, the upper lugs having a vertically disposed rectangular opening and the lower one having in its top a rectangular socket, of a handle having a lower arm formed with a rectangular depending end to enter said socket in the lower lug, said handle also having an upwardly inclined upper arm provided at its extremity with a horizontal portion adapted to enter beneath the upper lug and formed in its top with a rectangular socket to register with said opening in the upper lug, said upper arm being formed upon its top intermediate its ends with spaced bearing ears, a latch lever pivoted intermediate its ends between said bearing ears and having its outer end shaped to provide a finger piece and its inner end formed with a depending rectangular projection to pass through the opening in the upper lug and enter the socket in the upper arm of the handle, and a leaf spring secured to the upper arm of the handle and bearing against the bottom of the finger piece of the latch lever, substantially as shown and described.

In testimony whereof I hereunto affix my signature in the presence of two witnesses.

JESSE O. DAVISON.

Witnesses:
BENJ. F. BINGHAM,
J. W. FLINN.